(12) United States Patent
Ghneim

(10) Patent No.: US 8,665,116 B2
(45) Date of Patent: Mar. 4, 2014

(54) PARKING ASSIST OVERLAY WITH VARIABLE BRIGHTNESS INTENSITY

(75) Inventor: Maher Ghneim, Livonia, MI (US)

(73) Assignee: Ford Global Technologies, Dearborn, MI (US)

( * ) Notice: Subject to any disclaimer, the term of this patent is extended or adjusted under 35 U.S.C. 154(b) by 492 days.

(21) Appl. No.: 12/917,309

(22) Filed: Nov. 1, 2010

(65) Prior Publication Data

US 2012/0105251 A1  May 3, 2012

Related U.S. Application Data

(63) Continuation-in-part of application No. 12/838,470, filed on Jul. 18, 2010, now abandoned.

(51) Int. Cl.
*G08G 1/14* (2006.01)

(52) U.S. Cl.
USPC ............ 340/932.2; 340/441; 340/691.6

(58) Field of Classification Search
USPC ............ 340/932.2, 435, 425.5, 691.1, 691.6, 340/988–990, 995.1, 438, 441
See application file for complete search history.

(56) References Cited

U.S. PATENT DOCUMENTS

| | | | |
|---|---|---|---|
| 5,155,683 A | 10/1992 | Rahim | |
| 6,366,221 B1 | 4/2002 | Lisaka et al. | |
| 6,411,867 B1 | 6/2002 | Sakiyama et al. | |
| 6,483,442 B2 | 11/2002 | Shimizu et al. | |
| 6,567,726 B2 | 5/2003 | Sakiyama et al. | |
| 6,611,744 B1 | 8/2003 | Shimazaki et al. | |
| 6,621,421 B2 * | 9/2003 | Kuriya et al. | 340/932.2 |
| 6,657,555 B2 | 12/2003 | Shimizu et al. | |
| 6,825,779 B2 | 11/2004 | Yasui et al. | |
| 6,970,184 B2 * | 11/2005 | Hirama et al. | 348/148 |
| 7,012,549 B2 * | 3/2006 | Mizusawa et al. | 340/932.2 |
| 7,012,550 B2 | 3/2006 | Iwakiri et al. | |
| 7,053,795 B2 | 5/2006 | Maemura et al. | |
| 7,058,207 B2 | 6/2006 | Iida et al. | |
| 7,218,758 B2 | 5/2007 | Ishii et al. | |
| 7,295,227 B1 * | 11/2007 | Asahi et al. | 348/118 |
| 7,363,130 B2 | 4/2008 | Sakakibara | |
| 7,366,595 B1 | 4/2008 | Shimizu et al. | |
| 7,515,067 B2 | 4/2009 | Uemura | |
| 7,940,193 B2 | 5/2011 | Yamanaka | |
| 2006/0255969 A1 | 11/2006 | Sakakibara | |
| 2006/0274147 A1 | 12/2006 | Chinomi et al. | |
| 2006/0287826 A1 * | 12/2006 | Shimizu et al. | 701/216 |
| 2007/0057816 A1 | 3/2007 | Sakakibara et al. | |
| 2007/0146166 A1 | 6/2007 | Sato et al. | |
| 2008/0158011 A1 | 7/2008 | Yamanaka | |
| 2008/0174452 A1 * | 7/2008 | Yamamoto et al. | 340/932.2 |
| 2008/0231701 A1 | 9/2008 | Greenwood et al. | |
| 2009/0021396 A1 | 1/2009 | Hedderich | |
| 2009/0079828 A1 | 3/2009 | Lee et al. | |
| 2009/0091475 A1 | 4/2009 | Watanabe et al. | |
| 2009/0303080 A1 | 12/2009 | Kadowaki et al. | |
| 2010/0079307 A1 * | 4/2010 | Tanaka et al. | 340/932.2 |
| 2010/0231417 A1 | 9/2010 | Kadowaki et al. | |
| 2012/0016555 A1 | 1/2012 | Ghneim | |
| 2012/0105251 A1 | 5/2012 | Ghneim | |
| 2012/0296523 A1 | 11/2012 | Ikeda et al. | |

* cited by examiner

*Primary Examiner* — Daniel Previl

(74) *Attorney, Agent, or Firm* — Angela M Brunetti; Frank MacKenzie

(57) ABSTRACT

A parking assist system overlay that adjusts the color and/or intensity of locus lines at a predetermined steering wheel angle to alert a vehicle operator that static or dynamic locus lines should be followed to ensure the vehicle successfully reaches a target parking space.

12 Claims, 2 Drawing Sheets

PARKING ASSIST OVERLAY WITH VARIABLE BRIGHTNESS INTENSITY

CROSS REFERENCE TO RELATED APPLICATION

The present invention is a continuation-in-part, and claims priority to, co-pending U.S. patent application Ser. No. 12/838,470, filed Jul. 18, 2010, titled "Method and System for Parking Assist", the disclosure of which is incorporated herein by reference.

TECHNICAL FIELD

The present invention is related to parking assist systems and more particularly to display overlays in a parking assist system.

BACKGROUND

In a conventional parking assist system, a camera attached to a rear end of a vehicle takes an image of a rear field view from the vehicle. The rear field view image is displayed to a vehicle operator of the vehicle. When a vehicle operator is backing up the vehicle, as when backing into a parking space or attempting to attach a trailer to the vehicle, the parking assist system superimposes an overlay of locus lines onto the image in accordance with a steering angle of the steering wheel in order to identify a target, such as the parking spot or the trailer, for the vehicle operator. Some systems use two sets of locus lines. A first set is static. The static locus lines remain in the image to help a vehicle operator of a vehicle understand the actual vehicle position once the vehicle is moving. A second of locus lines set is dynamic. The dynamic locus lines move according to wheel position and help the vehicle operator understand the path and direction of the vehicle.

The dynamic locus lines may move according to the steering wheel position and help the vehicle operator understand the actual vehicle position once the vehicle is moving. However, the vehicle operator does not know when the correct park position has been reached just by looking at the locus lines. Furthermore, the two sets of locus lines, static and dynamic, may introduce confusion as to which set of lines the vehicle operator should follow.

There is a need for a parking assist system that displays an overlay with locus lines of varying intensity. Adjusting the intensity of the locus lines at certain wheel angles aids the vehicle operator in realizing the actual vehicle path in relation to the target vehicle path.

SUMMARY

The present invention is a parking assist system overlay that adjusts the color and/or intensity of locus lines at a predetermined steering wheel angle to alert a vehicle operator that static or dynamic locus lines should be followed to ensure the vehicle successfully reaches a target parking space.

According to the present invention, upon reaching a predetermined steering wheel angle, the intensity of static locus lines is gradually faded in order to highlight to the vehicle operator the need to follow the dynamic locus lines. According to another embodiment of the present invention, the intensity of dynamic locus lines is gradually increased to highlight the operator's attention to the dynamic locus lines.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DESCRIPTION OF INVENTION

While various aspects of the present invention are described with reference to a particular illustrative embodiment, the invention is not limited to such embodiments, and additional modifications, applications, and embodiments may be implemented without departing from the present invention. In the figures, like reference numbers will be used to illustrate the same components. Those skilled in the art will recognize that the various components set forth herein may be altered without varying from the scope of the inventive subject matter.

Figure 1:
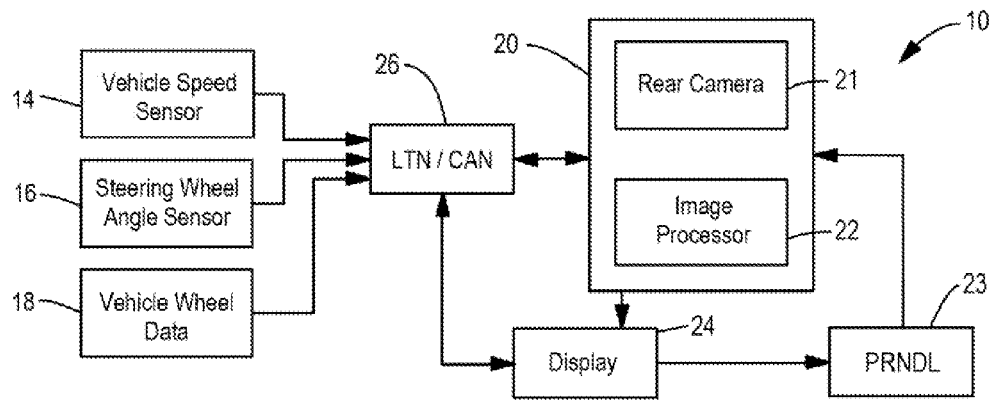
FIG. 1 is a block diagram of a park assist system.

FIG. 1 shows a block diagram of a parking assist system for a vehicle (not shown), such as an automobile. The parking assist system has a camera module 20 that may control a variety of programs and processes that are related to the image processing, calculation and display of locus lines according to the present invention. The camera module 20 receives various inputs from a variety of vehicle sensors that include, but are not limited to, a vehicle speed sensor 14 and a steering wheel angle sensor 16. Vehicle wheel data 18 is also supplied to the camera module 20 and includes, but is not limited to, gear ratio, wheel base size, and wheel radius of the vehicle. Vehicle wheel data 18 may be stored in memory (not shown) in the camera module 20 to be called upon as needed. A camera 21 provides image data to the camera module 20. The camera 21 is typically mounted on the rear of the vehicle to provide rear-facing image data. The image data provided by the camera 21 is data that may be processed as by an image processor 22, and used in the camera module 20 to calculate and display an overlay that includes locus lines according to the present invention. In FIG. 1, the camera 21 and image processor 22 are shown as integrated into the camera module 20. It should also be noted that in the alternative the devices 20, 21, 22 may be separate units in communication with each other.

A display 24 in the vehicle shows the camera output image and added locus lines, to a vehicle operator. The camera module 20 may also be coupled to a vehicle control network 26, such as an LIN or a CAN for communicating vehicle data and inputs 14, 16, 18 to the camera module 20. The camera module 20 also uses information about whether the vehicle is in park, reverse, neutral, drive, or low gear, also known as PRNDL 23, located on the vehicle. Typically, when the vehicle is in reverse, R, the camera 21 provides image data to the camera module 20, which is processed by the image processor 22 and shown on the display 24.

Figure 2:
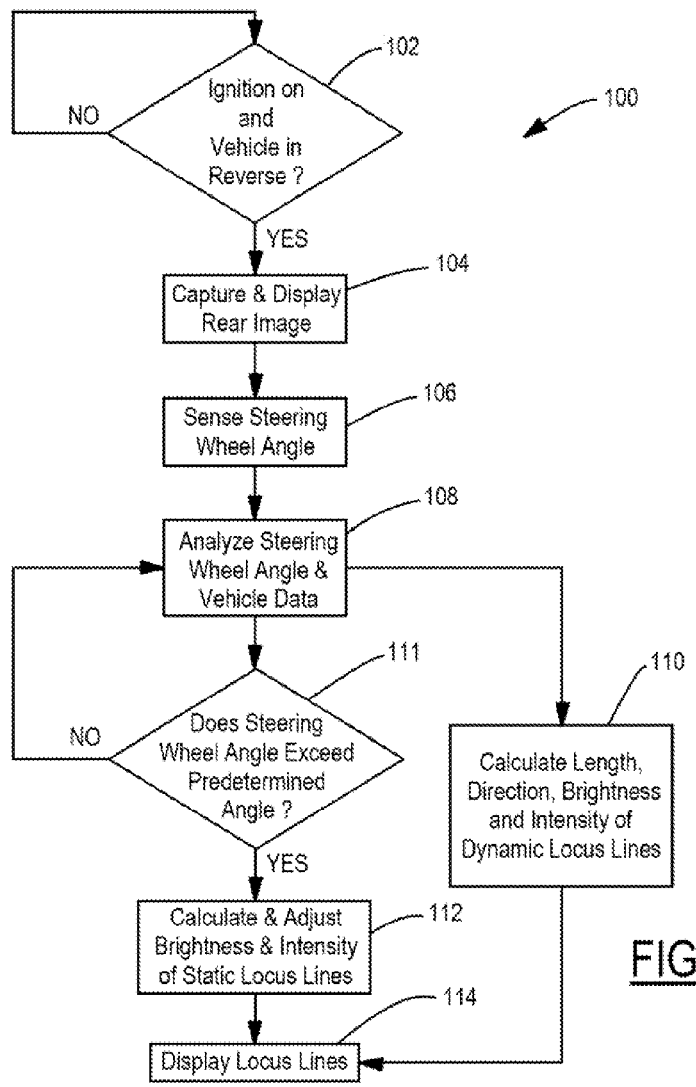
FIG. 2 is a flow chart of the park assist method of the present invention.
Figure 3:
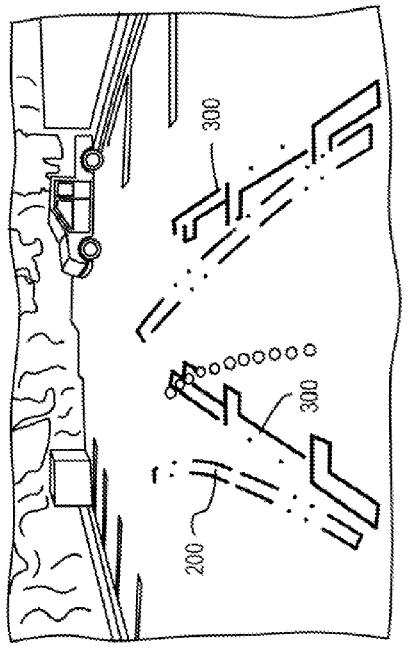
FIG. 3 is a diagram of a display for static and dynamic locus lines according to the present invention.
Figure 4:
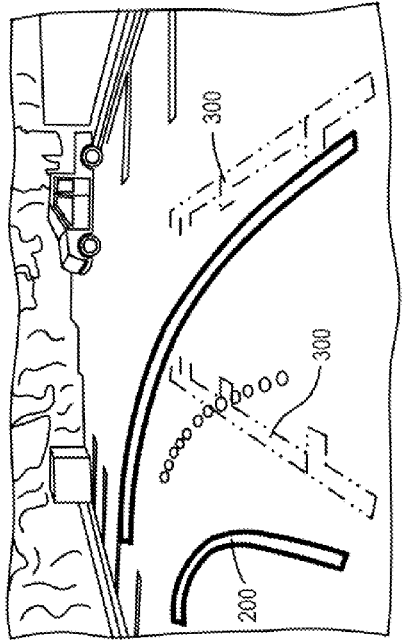
FIG. 4 is a diagram of a display for static and dynamic locus lines according to the present invention.
Figure 5:
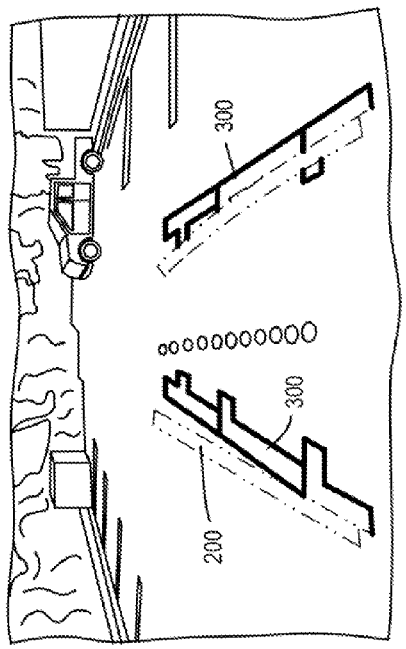
FIG. 5 is a diagram of a display for static and dynamic locus lines according to the present invention.
Figure 6:
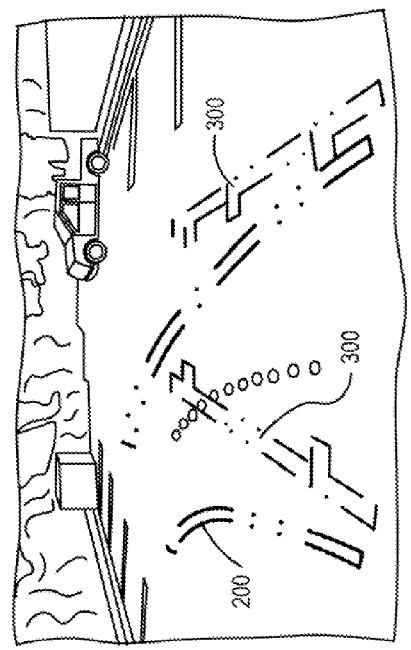
FIG. 6 is a diagram of a display for static and dynamic locus lines according to the present invention.

FIG. 2 shows a flow chart of a parking assist method 100 of the present invention. Upon start-up of the vehicle, for example an ignition on, and when the vehicle is in reverse 102, a rear-view image is captured and displayed 104 on the display. An overlay is presented to the operator which includes static and dynamic locus lines to aid the vehicle operator in maneuvering the vehicle to a target, such as a parking spot. As the vehicle operator turns the steering wheel, the steering wheel angle sensor sends 106 steering wheel angle data to the controller. The camera and image processor analyze 108 the data coming from the steering wheel angle sensor, along with other vehicle data, including the gear ratio, wheel base size, wheel radius and vehicle speed data, and calculates 110 a proper size and direction for two sets of locus lines to be displayed as an overlay in the camera image, a set of dynamic locus lines and a static locus lines.

The dynamic locus lines displayed have a direction that may be determined in response to a change in the steering wheel angle and other vehicle data related to wheel base, radius, and gear radio. Each step of calculating dynamic locus lines depends on the turning radius and the current steering wheel angle of the vehicle, so the locus lines will change as the steering wheel angle is changed. As the operators turns the steering wheel, each step and direction the steering wheel moves is reflected in the locus line direction as displayed. Each time the steering angle changes, a replacement set of dynamic locus lines is displayed. In this respect, the dynamic locus lines display a true path of the vehicle so that the vehicle operator gets a true sense of where the vehicle is headed as they turn the wheel and approach their desired destination.

As the steering wheel angle moves from a center position, not only the direction of the dynamic locus lines is adjusted but the length of the locus lines may also be adjusted accordingly. For example, as the steering wheel is turned away from center, the locus line length may be increased. As the steering wheel is turned towards center, the locus lines may be decreased in length. The dynamic locus lines have a maximum length at a steering wheel angle that is furthest from center and a minimum length at a steering wheel angle that is at center.

For each change in steering wheel angle, the camera module recalculates and displays the dynamic locus lines at the proper angle and length. At a maximum angle, either left or right of center, the locus lines extend to a maximum length dimension. The dynamic locus lines are providing the accurate projected vehicle path, and necessarily a path to the target only. The vehicle operator is given a true indication of where the vehicle is headed based on the steering wheel angle position and the vehicle wheel base information. The true vehicle path, as opposed to a vehicle path to a target, provides the vehicle operator with the ability to reach a desired location with ease, knowing for sure the direction the vehicle is headed by the locus lines displayed on the display.

In addition to the dynamic locus lines, static locus lines are displayed. The static locus lines are fixed and provide the vehicle path to a target. Unlike the dynamic locus lines, the static locus lines remain fixed in length and direction. According to the present invention, upon exceeding a predetermined steering wheel angle 111, the static locus lines are adjusted in color, brightness, and intensity so as to fade 114 as the vehicle approaches its target. The fading is intended to draw the vehicle operator's focus from the static locus lines and toward the dynamic locus lines, thereby ensuring the vehicle is successfully maneuvered into the target, such as a desired parking spot.

In another embodiment of the inventive subject matter, the dynamic locus lines may also undergo adjustment to the brightness and intensity as they are displayed. However, the adjustment to the brightness and intensity of the dynamic locus lines is opposite that of the static locus lines. For example, as the brightness and intensity of the static locus lines is faded, the brightness and intensity of the dynamic locus lines is increased. The vehicle operator's attention is drawn from the static locus lines and attracted to the dynamic locus lines, thereby making the path that should be followed in order to reach the target clear to the vehicle operator.

FIGS. 3 through 6 show various stages of the dynamic locus lines 200 that are displayed to the vehicle operator, showing the actual path of the vehicle, as the vehicle operator moves the steering wheel. FIGS. 3 through 6 also show various stages of the static locus lines 300 that are displayed to the vehicle operator, in contrast to the actual path of the vehicle to aid the vehicle operator in directing the vehicle to a target. When the vehicle's steering wheel angle meets a predetermined value, preferably an angle from the steering wheel center position, the brightness and intensity of the static locus lines 300 is gradually decreased so as to draw the vehicle operator's attention away from the static locus lines 300 and towards the dynamic locus lines 200. At the same time, the dynamic locus lines 200 are increasing in brightness and intensity as the steering wheel is turned further from a center position. Likewise, when the vehicle operator turns the steering wheel back towards center, the brightness and intensity of the dynamic locus lines will decrease as the brightness and intensity of the static locus lines will increase. The locus lines that are increasing in intensity or brightness will attract the attention of the vehicle operator, detracting attention from the locus lines that are decreasing in intensity or brightness.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. The equations may be implemented with a filter to minimize effects of signal noises. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

What is claimed is:

1. A parking assist method comprising the steps of:
capturing a rear-facing image;
displaying the rear-facing image;
superimposing, by way of a camera module, an overlay on the rear-facing image, the overlay having a set of dynamic locus lines and a set of static locus lines;
sensing a vehicle steering wheel angle;
adjusting a brightness and intensity displayed for the locus lines in the overlay in accordance with the vehicle steering wheel angle.

2. The parking assist method as claimed in claim 1 wherein the step of adjusting a brightness and intensity displayed for the locus lines further comprises the steps of:
decreasing the brightness and intensity of the static locus lines as the steering wheel angle moves away from a predetermined steering wheel angle; and
increasing the brightness and intensity of the static locus lines as the steering wheel angle moves toward a predetermined steering wheel angle.

3. The parking assist method as claimed in claim 2 further comprising the steps of:
increasing the brightness and intensity of the dynamic locus lines as the steering wheel angle moves away from a predetermined steering wheel angle; and
decreasing the brightness and intensity of the dynamic locus lines as the steering wheel angle moves toward a predetermined steering wheel angle.

4. The parking assist method as claimed in claim 2 wherein the predetermined steering wheel angle is a predetermined angle from a center steering wheel position.

5. The parking assist method as claimed in claim 3 wherein the predetermined steering wheel angle is a predetermined angle from a center steering wheel position.

6. The parking assist method as claimed in claim 3 further comprising the steps of:
extracting vehicle wheel base data from memory in the camera module; and
calculating, in the camera module, a set of replacement dynamic locus lines in response to the steering wheel angle and the vehicle wheel base data, wherein a length of the dynamic locus lines is adjusted and displayed.

7. The parking assist method as claimed in claim 6 further comprising the steps of:
extending a length of the dynamic locus lines as the steering wheel angle moves away from a center steering, wheel angle position; and
decreasing a length of the dynamic locus lines as the steering wheel angle moves towards the center steering wheel angle position.

8. A parking assist method comprising the steps of:
capturing a rear-facing image;
displaying the rear-facing image;
superimposing, by way of a camera module, an overlay on the rear-facing image, the overlay having a set of dynamic locus lines and a set of static locus lines;
sensing a vehicle steering wheel angle;
adjusting a brightness and intensity displayed for the dynamic locus lines in the overlay in accordance with the vehicle steering wheel angle;
adjusting a brightness and intensity displayed for the static locus lines in the overlay in accordance with the vehicle steering wheel angle.

9. The parking assist method as claimed in claim 8 wherein the steps of adjusting a brightness and intensity displayed further comprises the steps of:
decreasing the brightness and intensity of the static locus lines as the steering, wheel angle moves away from a predetermined steering wheel angle;
increasing the brightness and intensity of the static locus lines as the steering wheel angle moves toward a predetermined steering wheel angle;
increasing the brightness and intensity of the dynamic locus lines as the steering wheel angle moves away from a predetermined steering wheel angle; and
decreasing the brightness and intensity of the dynamic locus lines as the steering wheel angle moves toward a predetermined steering wheel angle.

10. The parking assist method as claimed in claim 9 wherein the predetermined steering wheel angle is a predetermined angle from a center steering wheel position.

11. The parking assist method as claimed in claim 9 further comprising the steps of:
extracting vehicle wheel base data from memory in the camera module; and
calculating, in the camera module, a set of replacement dynamic locus lines in response to the steering wheel angle and the vehicle wheel base data, wherein a length of the dynamic locus lines is adjusted and displayed.

12. The parking assist method as claimed in claim 11 further comprising the steps of:
extending a length of the dynamic locus lines as the steering wheel angle moves away from a center steering, wheel angle position; and
decreasing a length of the dynamic locus lines as the steering wheel angle moves towards the center steering wheel angle position.

* * * * *